United States Patent [19]

Ekström et al.

[11] 3,842,337

[45] Oct. 15, 1974

[54] THYRISTOR RECTIFIER HAVING A DEVICE FOR SELF-IGNITION OR RECOVERY PROTECTION

[75] Inventors: Åke Ekström; Lars-Erik Juhlin; Karl-Erik Olsson, all of Ludvika, Sweden

[73] Assignee: Allmanna Svenska Elektriska Aktiebolaget, Vasteras, Sweden

[22] Filed: June 18, 1973

[21] Appl. No.: 370,753

[30] Foreign Application Priority Data
July 10, 1972 Sweden.............................. 9080/72

[52] U.S. Cl.............. 321/27 R, 307/252 L, 321/11
[51] Int. Cl............................................. H02m 7/48
[58] Field of Search .............................. 307/252 L; 321/11–14, 27 R

[56] References Cited
UNITED STATES PATENTS

| | | | |
|---|---|---|---|
| 3,424,948 | 1/1969 | Ravas................. | 321/11 X |
| 3,536,985 | 10/1970 | Ekstrom................ | 321/13 |
| 3,551,778 | 12/1970 | Ekstrom................ | 321/5 |
| 3,654,541 | 4/1972 | Kelly, Jr. et al. ....... | 321/13 |

*Primary Examiner*—William M. Shoop

[57] ABSTRACT

A thyristor rectifier for high voltage includes a number of series-connected thyristors with a control device for each thyristor and a control circuit for the whole rectifier connected to the control devices. There is a control pulse emitter in each control device which emits an indicating pulse when the voltage over the corresponding thyristor in the conducting direction amounts to a certain value. A protection device is provided which emits a signal for the whole rectifier through a control pulse transmitter if a voltage grows in the conducting direction of the rectifier at a time when only an insufficient number of thyristors have regained their blocking ability. This protection device includes a memory circuit and a counter to register the indicating pulses from the emitters of the control devices and an output circuit connected between the counter and the control pulse transmitter which emits a signal for ignition of the whole thyristor in dependence on a predetermined number of indicating pulses.

8 Claims, 3 Drawing Figures

3,842,337

THYRISTOR RECTIFIER HAVING A DEVICE FOR SELF-IGNITION OR RECOVERY PROTECTION

BACKGROUND OF THE INVENTION

Field of the Invention

The present invention relates to a thyristor rectifier for high voltage comprising a number of series-connected thyristors and being provided with a device for so-called self-ignition or recovery protection, i.e. a protection device intended to prevent individual thyristors, which after a conducting interval have regained their blocking ability before the whole rectifier has gained sufficient blocking ability, from becoming destroyed by the voltage growing over the rectifier in its conducting direction. The situation arises in the case of disturbances, normally network disturbances, in which case the rectifier is given insufficient time to recover. The protection device is based on the already known principle of an ignition signal being emitted to the whole rectifier in the case in which thyristors which have recovered cause a risk of overloading by the growing voltage.

The thyristor rectifier is of the type in which each individual thyristor is provided with a control device controlled from a control circuit common for the whole rectifier, said control devices being each provided with a signal emitter which emits an indicating pulse when the voltage over the proper thyristor in the conducting direction amounts to a certain value.

SUMMARY OF THE INVENTION

The recovery protection device according to the invention is based on the principle of recording and counting said indicating pulses so that pulses from too low a number of thyristors at a certain time cause reignition of the rectifier. The rectifier, which is composed of a number of series-connected thyristors, each of which is provided with a control device, has a control circuit for the whole rectifier. A control pulse emitter in each control device emits an indicating pulse when the voltage over the corresponding thyristor in the conducting direction amounts to a certain value. The thyristor rectifier is provided with a device for self-ignition protection for the thyristors which includes means to emit a signal for the whole rectifier through a control pulse transmitter in the control circuit if a voltage grows in the conducting direction of the rectifier at a time when only an insufficient number of thyristors have regained their blocking ability. This self-ignition arrangement includes a memory circuit and a counter which registers the indicating pulses from the emitting means of the control devices and an output circuit for the protection device which is connected between the counter and the control pulse transmitter. This output circuit includes means to emit a signal for ignition of the whole thyristor rectifier in dependence on a predetermined number of indicating pulses.

Recovery protection devices for the present purposes are known previously but are based on the principle of sensing the voltage over the whole thyristor, which requires expensive measuring voltage dividers. Even in those cases when such measuring voltage dividers are present, the principle according to the invention may allow more simple designs of the recovery protection.

BRIEF DESCRIPTION OF THE DRAWINGS

In other respects the invention will be further explained with reference to the accompanying drawing, in which FIG. 1 shows a thyristor rectifier having control devices and control circuits and a recovery protection device according to the invention, whereas

DESCRIPTION OF THE PREFERRED EMBODIMENTS

Figure 1:
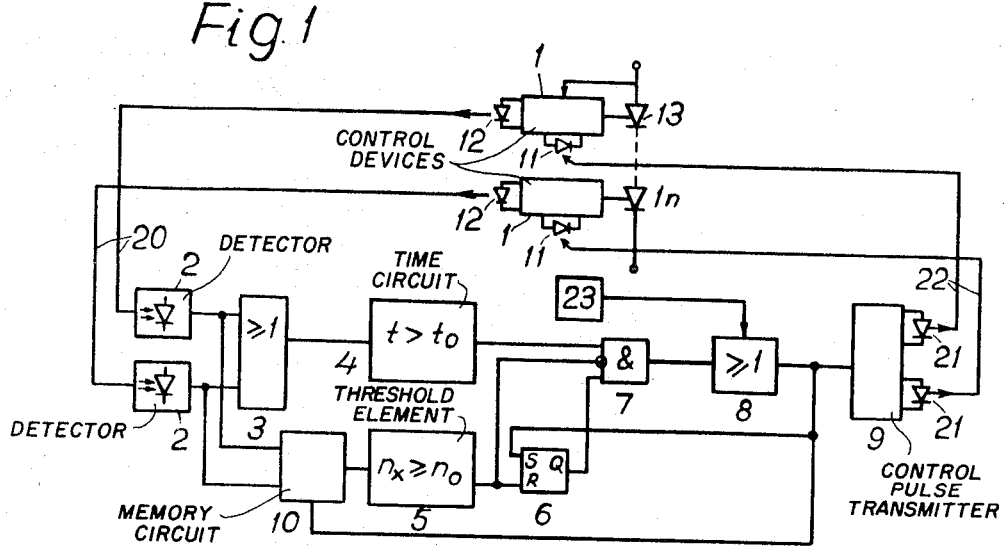

FIG. 1 shows a number of series-connected thyristors 13-1n together forming a thyristor rectifier for high voltage as such rectifiers are used in static converters, for example for direct current transmissions. One end connection of the rectifier is normally connected to the direct current side of the static converter, whereas the other is connected to the alternating current side.

Each thyristor is provided with a control device 1, for example according to Lindblom U.S. Pat. No. 3,794,908 with a detector in the form of a photo diode 11 influenced by a control pulse transmitter 9 and a signal emitter in the form of a light diode 12 emitting an indicating pulse when the voltage in the conducting direction over the proper thyristor amounts to a certain value.

The indicating pulses from the signal emitters 12 are transmitted through light conductors 20 to detectors 2, for example in the form of photo diodes, at the input side of an Or-gate 3 which emits signals to a time circuit 4 for the incoming signals from the detectors 2. Said time circuit is built up as a monostable flip-flop which is switched on for an incoming signal from the Or-gate and which, when resetting a certain time $t_o$ after the signal from 3, emits an output signal to an And-gate 7. This means thus that the flip-flop 4 cannot deliver any output signal as long as the signals from 3 arrive at shorter intervals than the time $t_o$. This time, i.e. the time of reset of the flip-flop 4, is chosen so long that it exceeds the time intervals between the signals from 3 as long as the thyristors 13-1n recover normally in time with the growing voltage over the thyristor rectifier. At the same time, $t_o$ must not be longer than what corresponds to a reasonable growth of the voltage over the thyristor rectifier, i.e. the signal at the end of the time $t_o$ must be emitted before the voltage over the thyristor rectifier has reached dangerous values for the blocked thyristors.

The signals from the detectors 2 are further supplied to a memory circuit 10 which is connected to a scanner 5 having the character of a threshold element. Of the number n of thyristors in the rectifier, at least a number $n_o$ is necessary in order safely to block for the blocking voltage in the conducting direction of the thyristor rectifier. The threshold element 5 is then arranged in such a way that, when the number of signals $n_x$ scanned from the memory 10 exceeds the number $n_o$, a signal is emitted from 5 to a negative input on the And-gate 7. The memory 10 records the signals from the detectors 2 independently of sequence and time, after which the threshold element 5 is able to count the number of blocking thyristors.

Between the threshold element 5 and the And-gate 7 there is further a flip-flop 6, the function of which is explained below and which can primarily be regarded as switched on, i.e. it emits a signal to the And-gate.

The operation will be the following: at the time $t_o$ after the latest signal from 3, the time circuit 4 emits a signal to the And-gate 7. A signal from 4 thus implies that all thyristors which may be expected to recover their blocking ability within a reasonable time have also done so. This can also be expressed in the following way: the time $t_o$ is so chosen in relation to the time of growth of the voltage in the conducting direction of the thyristor rectifier that, as long as the thyristors recover at shorter intervals than the time $t_o$, the number of blocked thyristors is sufficient to take up the growing voltage.

At a certain point this procedure comes to an end, i.e. no more signals arrive from 1, 2 and 3 and the time $t_o$ runs out, whereas the voltage over the rectifier grows up.

Whether the thyristor rectifier hereafter is able to block for the voltage depends on whether the number of blocked thyristors $n_r$ exceeds the required number $n_o$, which is sensed by the threshold element 5.

If this is the case, the element 5 emits a signal to the negative input on the And-gate 7 and if this signal precedes the signal from 4, all is well and nothing will happen since 7 only receives a signal from 4.

If, on the other hand, the thyristors recover too late, i.e. too few thyristors have recovered when 4 emits a signal, the And-gate 7 will receive a signal on all three inputs. Therefore, a signal will proceed to the input circuit 8 for the control pulse transmitter 9 which transmits ignition pulses to all thyristors 13-1n by way of light diodes 21 and through light conductors 22.

In this way, re-ignition of the thyristor rectifier is obtained, which causes a single commutation fault and thus a slight disturbance in the operation of the static converter. Compared to overloading the thyristors, which normally leads to total demolition of the whole thyristor set of the rectifier and to a resultant shutdown, such a disturbance is of no significance.

The flip-flop 6 is intended to be switched on by the signals from 8 so that the And-gate 7 is ready for control after the next conducting interval, whereas the flip-flop is switched off by the signal from 5. In this way, an undesired operation from the gate 7, owing to new pulse trains from 3 resulting from voltage transients over the thyristor rectifier, is prevented.

The input circuit 8 has the character of an Or-gate to which also the control pulses from the superior control system 23 of the static converter are connected.

The memory circuit 10 must be switched off at each conducting interval for the rectifier, which can be performed, for example, through the control pulses from 8 as indicated in FIG. 1.

The protection device shown in FIG. 1 can be varied in many ways.

The time circuit 4 can be changed so that, instead of recording the sequence of signals from 3, it records only the first of these signals and after a certain time $t_1$ gives a signal to the And-gate 7. This time $t_1$ is chosen so that it may be assumed that a sufficient number, $n_o$, of thyristors have time to recover during this period if they are faultless. In this way, the time circuit will be somewhat more simple but also less reliable for an exceptionally rapidly growing thyristor voltage. The time $t_1$ should, however, possibly be made dependent on the working parameters of the thyristor rectifier, above all on the load.

Figure 2:
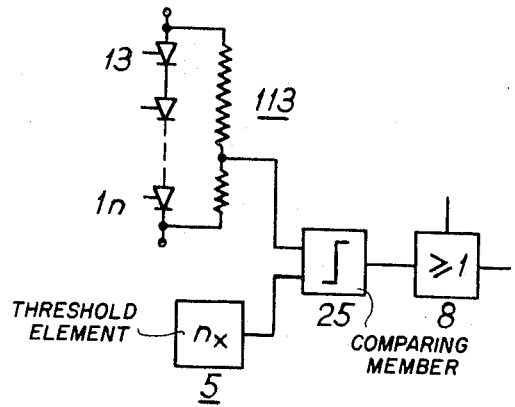
FIGS. 2 and 3 shows variants thereof.

In case it is possible to have a measuring voltage divider — which is expensive — over the whole thyristor rectifier, the time circuit 4 may be omitted and the circuit acquires the construction shown in FIG. 2.

Connected in parallel with the rectifier is a resistive measuring voltage divider 113 having an intermediate terminal connected to a comparing member 25. Also the signal from 5 is connected to this member 25 then being designed as a counter, the output signal of which is quite simply proportional to the number of thyristors $n_r$ which have recovered. The signal from 5 thus becomes a measure of the current blocking ability of the thyristor rectifier, said blocking ability being compared to the present voltage over the rectifier, and, if there is not enough security margin, the member 25 sends a signal to the gate 8 to re-ignite the rectifier.

Figure 3:
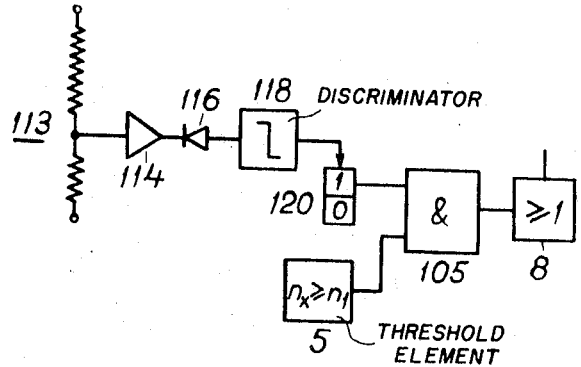

The idea of the invention may also be applied in connection with previously known recovery protection devices and thus improve their function. For example, the circuit 2, 3, 10, 5 may be connected into the protection device shown in Boksjo U.S. Pat. application No. 7,843, filed Feb. 2, 1970, FIG. 3, which is thus constructed according to the accompanying FIG. 3. The designations correspond to those used in FIG. 3 of said patent and in the accompanying FIG. 1.

The measuring voltage divider 113 is connected to the discriminator 118 by way of the amplifier 114 and the diode 116, said discriminator emitting a signal to the monostable flip-flop 120 when the rectifier voltage becomes negative after a conducting interval. For a certain amount of time the flip-flop 120 will therefore emit a signal to the And-gate 105 which corresponds to the And-gate 7 in the accompanying FIG. 1. The threshold element 5 emits a signal to 105 when the number of blocked thyristors, $n_r$, reaches a certain low number $n_1$, which indicates that the rectifier receives positive voltage.

The members 5 and 120 are connected to the And-gate 105, which means that nothing will happen if the signal from 5 arrives after the signal from 120 has ceased. On the other hand, if the signal from 5 arrives before the signal from 120 has ceased, the blocking ability of the thyristor is endangered and 105 sends a signal to the gate 8 to re-ignite the thyristor rectifier.

A considerable advantage of the invention is that the condition of the rectifier is constantly recorded and can be read in some way from the memory 10. This means that the static converter in inverter operation can be allowed to work with a very close margin of commutation with a resultant small reactive power requirement.

We claim:

1. Thyristor rectifier for high voltage comprising a number of series-connected thyristors (13-1n) each provided with a control device (1), and a control circuit (23,8,9) for the whole rectifier, a control pulse transmitter (8,9) in the control circuit for controlling the control devices, each control device including means (12) for emitting an indicating pulse when the voltage over the corresponding thyristor in the conducting direction amounts to a certain value, and the thyristor rectifier being provided with a device for self-ignition protection for the thyristors, said protection device including means to emit a signal for ignition of the whole rectifier through the control pulse transmitter if a voltage grows in the conducting direction of the rectifier at a time when only an insufficient number of thyristors have regained their blocking ability, said self-ignition protection comprising a memory circuit (10) and a counter (5) to register said indicating pulses from the signal emitting means (12) of the control devices (1) and an output circuit (7 or 25 or 105) for the protection device connected between said counter (5) and said control pulse transmitter (8,9), said output circuit including means to emit a signal for ignition of the whole thyristor rectifier in dependence on a predetermined number of indicating pulses.

2. Thyristor rectifier according to claim 1, in which said counter (5) includes a threshold means for emitting a signal when the number of indicating signals have reached a certain magnitude, a time signal emitter (4), said output circuit (7) including an AND-gate comparing the simultaneity of the signal from said counter with the signal from said time signal emitter in such a way that, if the signal from the counter (5) occurs later the signal from the time signal emitter, the output circuit emits a signal to the control pulse transmitter (8,9) to ignite the thyristor rectifier.

3. Thyristor rectifier according to claim 2, having a time signal emitter (120) which emits its signal to the output circuit (105) during a certain time after the voltage over the rectifier in its blocking direction has grown to a certain value, and means to obtain an output signal from the output circuit (105) if a signal from the counter (5) is obtained during the signal time of the time signal emitter.

4. Thyristor rectifier according to claim 2, in which the time signal emitter (4) emits a signal to the output circuit (7) having a certain delay in relation to any of said indicating pulses from the control devices (1).

5. Thyristor rectifier according to claim 4, in which said delay is counted from the first of said indicating pulses.

6. Thyristor rectifier according to claim 4, in which said delay is counted from the latest of said indicating pulses.

7. Thyristor rectifier according to claim 4, in which the length of said delay is determined in dependence on the growth of the voltage over the thyristor rectifier in its conducting direction.

8. Thyristor rectifier according to claim 1, in which the number of indicating pulses during which the output circuit (25) is to emit a signal is determined in dependence on the growing voltage over the thyristor rectifier in its conducting direction.

* * * * *